(12) United States Patent
Reynolds et al.

(10) Patent No.: US 8,753,237 B2
(45) Date of Patent: Jun. 17, 2014

(54) ALTERNATOR WITH DECOUPLING DEVICE

(75) Inventors: Brian Reynolds, Dublin, OH (US); Douglas Breglia, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 490 days.

(21) Appl. No.: 13/050,456

(22) Filed: Mar. 17, 2011

(65) Prior Publication Data

US 2012/0235547 A1   Sep. 20, 2012

(51) Int. Cl.
  *H02K 7/10*  (2006.01)
(52) U.S. Cl.
  USPC ............................................. 474/70; 310/75 R
(58) Field of Classification Search
  USPC .......................................... 310/75 R; 474/70
  See application file for complete search history.

(56) References Cited

U.S. PATENT DOCUMENTS

| | | | |
|---|---|---|---|
| 1,472,782 A | 11/1923 | Barber | |
| 5,139,463 A * | 8/1992 | Bytzek et al. | 474/69 |
| 5,156,573 A | 10/1992 | Bytzek et al. | |
| 5,163,883 A * | 11/1992 | Bradfield | 474/166 |
| 5,324,237 A * | 6/1994 | Bilsing et al. | 474/94 |
| 5,443,372 A * | 8/1995 | Kanoll | 417/319 |
| 5,599,245 A * | 2/1997 | Giese | 474/135 |
| 6,044,943 A | 4/2000 | Bytzek et al. | |
| 6,059,085 A * | 5/2000 | Farnsworth | 192/55.1 |
| 6,083,130 A | 7/2000 | Mevissen et al. | |
| 6,332,842 B1 * | 12/2001 | Tabuchi et al. | 464/33 |
| 6,360,841 B1 * | 3/2002 | Blandino et al. | 180/443 |
| 6,719,537 B2 * | 4/2004 | Kawaguchi et al. | 417/223 |
| 6,969,935 B2 | 11/2005 | Sakakibara et al. | |
| 7,070,033 B2 | 7/2006 | Jansen et al. | |
| 7,153,227 B2 * | 12/2006 | Dell et al. | 474/70 |
| 7,645,196 B2 * | 1/2010 | Brinkmann et al. | 464/32 |
| 7,998,008 B2 * | 8/2011 | Kamdem et al. | 474/94 |
| 2003/0104890 A1 * | 6/2003 | Ochiai | 474/199 |
| 2006/0035736 A1 * | 2/2006 | Umeda et al. | 474/70 |
| 2008/0139351 A1 | 6/2008 | Pflug et al. | |
| 2012/0299415 A1 * | 11/2012 | Antchak et al. | 310/78 |
| 2013/0092501 A1 * | 4/2013 | Schneider et al. | 192/41 S |

* cited by examiner

*Primary Examiner* — William A Rivera
*Assistant Examiner* — Michael Riegelman
(74) *Attorney, Agent, or Firm* — Plumsea Law Group, LLC (57) ABSTRACT

An alternator assembly for a motor vehicle is disclosed. The alternator assembly includes a rotor including a shaft. A torsion member is disposed inside a central cavity of the shaft. A pulley is connected to the torsion member to allow some decoupling between the pulley and the shaft.

23 Claims, 7 Drawing Sheets

ALTERNATOR WITH DECOUPLING DEVICE

BACKGROUND

The present invention relates generally to a motor vehicle, and in particular to an alternator for a motor vehicle.

Alternators for motor vehicles have been previously proposed. Alternators may receive torque from a pulley that is driven by a belt connected to the crankshaft of the engine. In some situations, the belt tension becomes very high, which can reduce fuel economy.

The related art lacks provisions for efficiently reducing the rigidity of the alternator-pulley system to help reduce drive belt tension.

SUMMARY

In one aspect, the invention provides an alternator assembly for a motor vehicle, comprising: a housing; a shaft configured to rotate with respect to the housing, the shaft being associated with a rotor; the shaft including a central cavity, a first end portion and a second end portion; a torsion member including a first end portion and a second end portion; the torsion member being disposed within the central cavity of the shaft so that the second end portion of the torsion member is attached to the second end portion of the shaft; a pulley associated with a belt, the pulley being disposed closer to the first end portion of the shaft than the second end portion of the shaft in an axial direction; and wherein the first end portion of the torsion member is fastenably attached to the pulley.

In another aspect, the invention provides an alternator assembly for a motor vehicle, comprising: a housing; a shaft configured to rotate with respect to the housing, the shaft being associated with a rotor; the shaft including a first end portion and a second end portion; a pulley disposed adjacent to the first end portion of the shaft, the pulley being associated with a belt; a torsion member; and wherein the pulley is connected to the second end portion of the shaft by the torsion member and wherein torque is transferred directly between the pulley and the second end portion of the shaft by the torsion member.

In another aspect, the invention provides an alternator assembly for a motor vehicle, comprising: a housing; a shaft configured to rotate with respect to the housing, the shaft being associated with a rotor; the shaft including a central cavity, a first end portion and a second end portion; a torsion member including a first end portion and a second end portion; a pulley attached to the first end portion of the torsion member; the torsion member being disposed within the central cavity of the shaft so that the second end portion of the torsion member is coupled to the second end portion of the shaft; and wherein the second end portion of the torsion member is coupled to the second end portion of the shaft in a manner so that the torsion member transfers torque to the shaft while rotating at a speed greater or equal to the speed of the shaft and wherein the torsion member rotates independently of the shaft while rotating at a speed that is less than the speed of the shaft.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
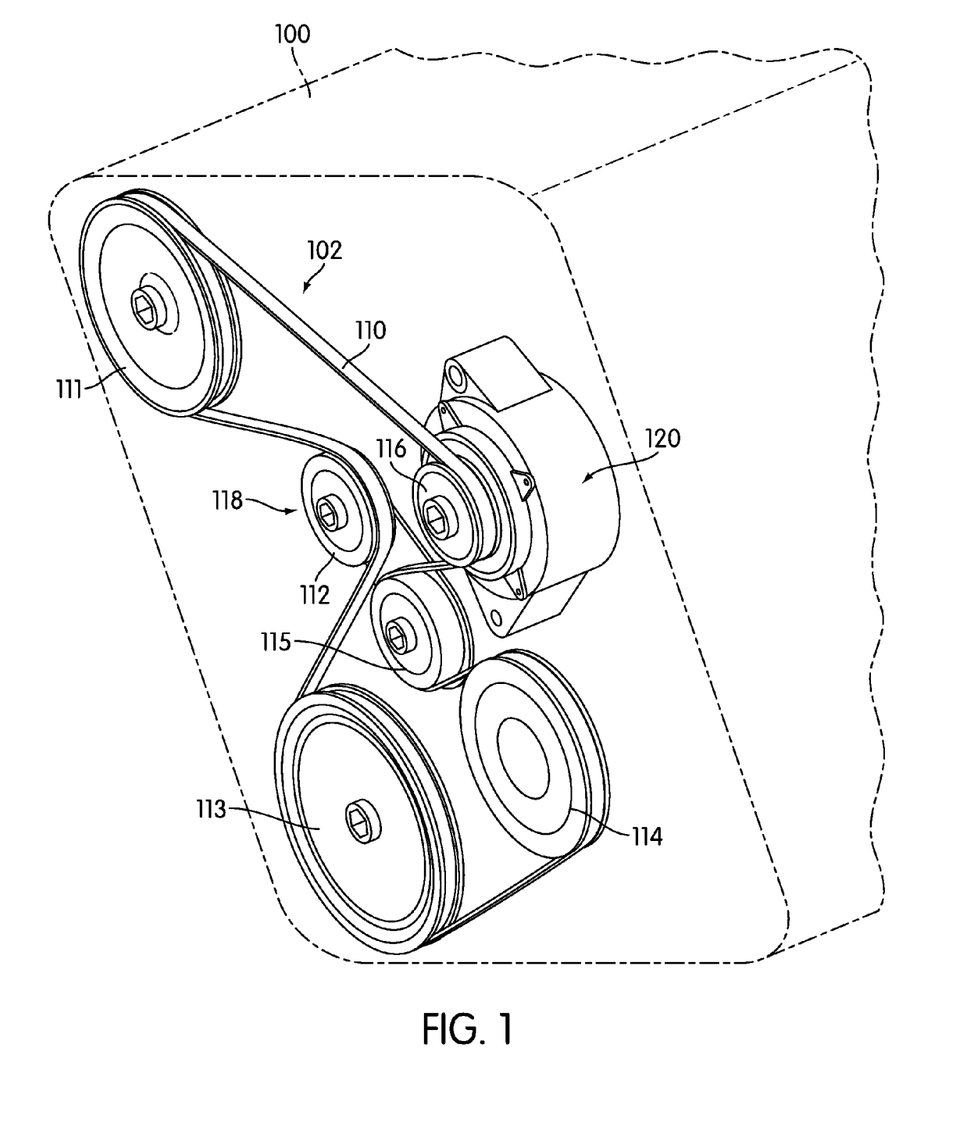
FIG. 1 is a schematic isometric view of an embodiment of a drive system for an engine.

FIG. 1 is an isometric view of an embodiment of engine 100 for a motor vehicle. The term "motor vehicle" as used throughout this detailed description and in the claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

For purposes of clarity, engine 100 is shown schematically in the current embodiment. In other embodiments, engine 100 could have any other shape, size or configuration. Moreover, engine 100 could be an internal combustion engine having any number of cylinders. Engine 100 may be associated with drive system 102. Drive system 102 may further include belt 110. In some cases, belt 110 may be an endless belt that connects one or more components. In some cases, belt 110 may be a serpentine belt.

In some cases, drive system 102 may include one or more pulleys. In one embodiments, drive system 102 includes driving pulley 111. Driving pulley 111 may engage the end of an output shaft of engine 100 and may be used for driving belt 110. In addition, drive system 102 can further include driven pulleys 118. Driven pulleys 118 can comprise pulley 112, pulley 113, pulley 114, pulley 115 and pulley 116.

In different embodiments, the number of pulleys comprising driven pulleys 118 can vary. In the current embodiment, drive system 102 includes five driven pulleys. In other embodiments, however, any other number of driven pulleys can be used. Moreover, the size and/or shape of any of driven pulleys 118 can vary in different embodiments.

In some cases, one or more driven pulleys 118 can be connected to shafts associated with one or more engine components or vehicle components. In some cases, some of driven pulleys 118 may be connected to shafts associated with a water pump, an alternator, an air conditioning system, an oil pump and/or any other engine or vehicle components. In the current embodiment, pulley 116 is associated with alternator assembly 120 and is used to provide torque to alternator assembly 120. Additionally, in some embodiments, one or more of driven pulleys 118 could be idler pulleys that are not connected directly to the shafts of engine components or vehicle components.

It should be understood that the current embodiment of drive system 102 is only intended as an example. In other embodiments, any other arrangement for drive system 102 may be used. For example, in other embodiments, drive system 102 could comprise any number of pulleys and belts configured in any arrangement.

Figure 2:
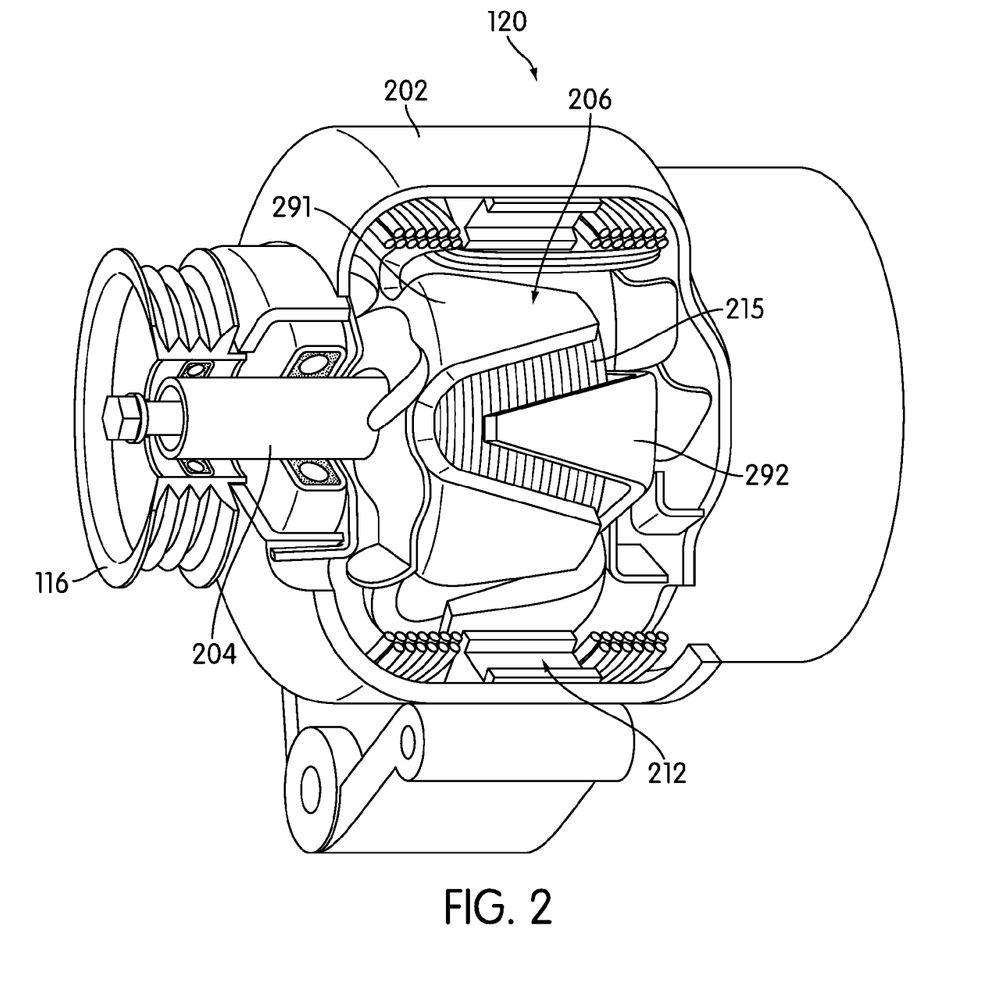
FIG. 2 is an isometric cut away view of an embodiment of an alternator assembly.

FIG. 2 illustrates an isometric cut away view of an embodiment of alternator assembly 120. Alternator assembly 120 comprises housing 202 that provides a protective outer casing for various internal components of alternator assembly 120. Alternator assembly 120 may also include rotor 206. Rotor 206 comprises shaft 204. Rotor 206 may also comprise first pole core 291 and second pole core 292. Each of first pole core 291 and second pole core 292 include alternating claw portions that are configured in an inter-digitated arrangement. Moreover, field windings 215 are disposed between first pole core 291, second pole core 292 and shaft 204.

Alternator assembly 120 may also include stator 212 that is disposed within housing 202 and that further surrounds rotor 206. Stator 212 and rotor 206 may be spaced apart so that rotor 206 can rotate within stator 212. Alternator assembly 120 may further include additional components not shown in the current embodiment including brushes, slip rings, a rectifying device as well as other components known in the art for use with an alternator.

The general operation of alternator assembly 120 may be understood as follows. A current may be supplied to field windings 215 as rotor 206 rotates due to torque applied from pulley 116. The current may be supplied to field windings 215 by slips rings and brushes (not shown). This current generates a magnetic field in rotor 206 that further induces an alternating current within stator 212. The alternating current in stator 212 converts the induced current into power that can be supplied to a battery of the vehicle.

For purposes of clarity, only some components of alternator assembly 120 are shown and discussed in this detailed description. In other embodiments, any other components known in the art can be used with alternator assembly 120 for generating power that can be supplied to a battery or any other vehicle components. Moreover, the arrangement of components in the current embodiment is only intended to be exemplary and in other embodiments any other configuration can be used. One exemplary configuration for an alternator assembly is discussed in U.S. Pat. No. 6,969,935, the entirety of which is hereby incorporated by reference.

As previously mentioned, the operation of alternator assembly 120 requires torque to be applied from pulley 116 to rotor 206. In particular, as a crankshaft of engine 100 rotates (see FIG. 1), driving pulley 111 drives pulley 116 through belt 110. As pulley 116 rotates, torque is applied to rotor 206 which causes rotor 206 to spin within housing 202 and with respect to stator 212.

An alternator assembly can include provisions for partially decoupling a pulley and a rotor in order to shift the resonance of a drive system below engine idle RPM. This can help reduce the overall stiffness of the drive system and drive belt tension in order to improve fuel economy. In some embodiments, a pulley and a rotor may be partially decoupled using a torsion member of some kind. In an exemplary embodiment, a pulley may be attached to a torsion member that is disposed within a central cavity of a shaft of the rotor to provide partial decoupling.

Figure 3:
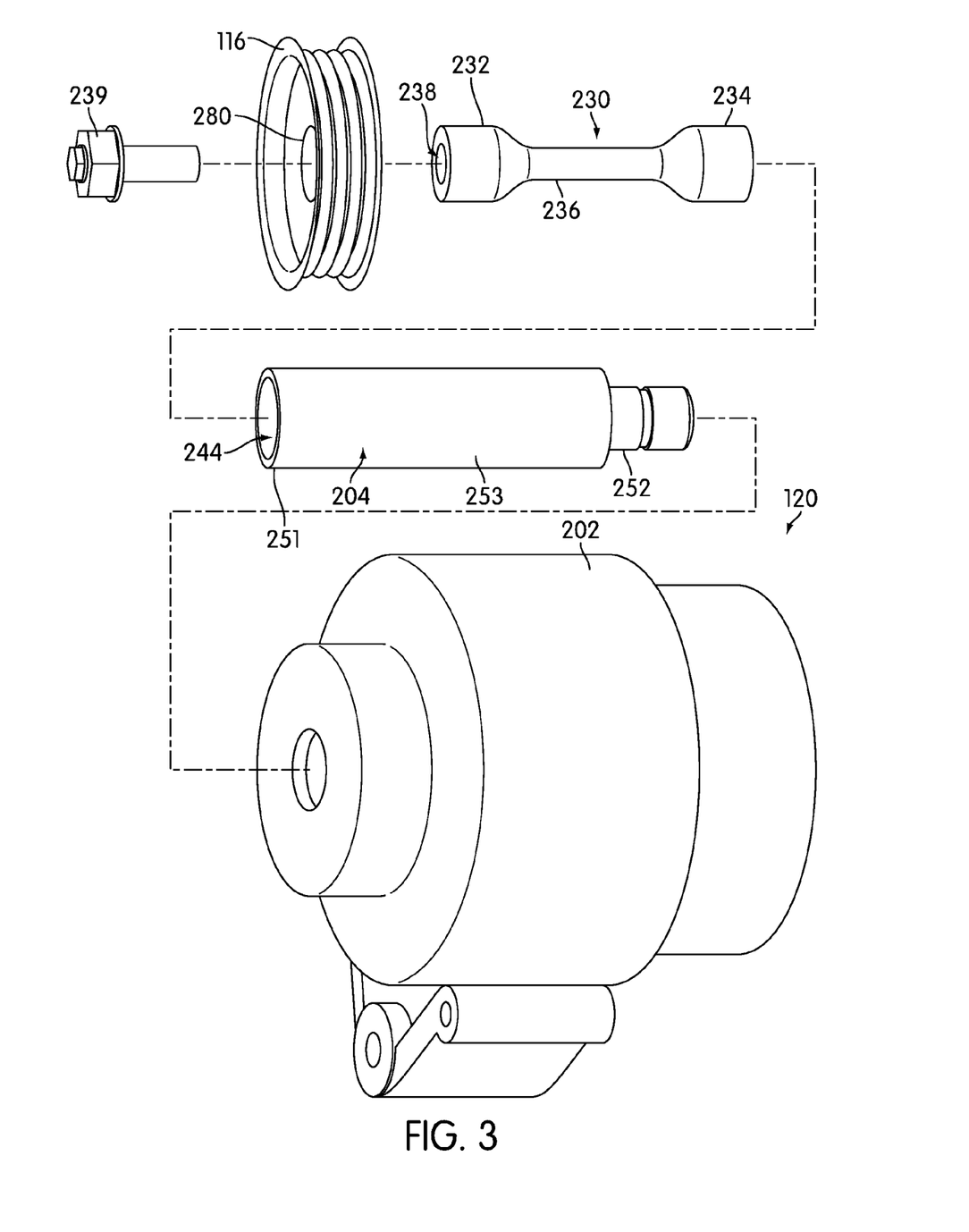
FIG. 3 is an exploded isometric view of an embodiment of an alternator assembly.
Figure 4:
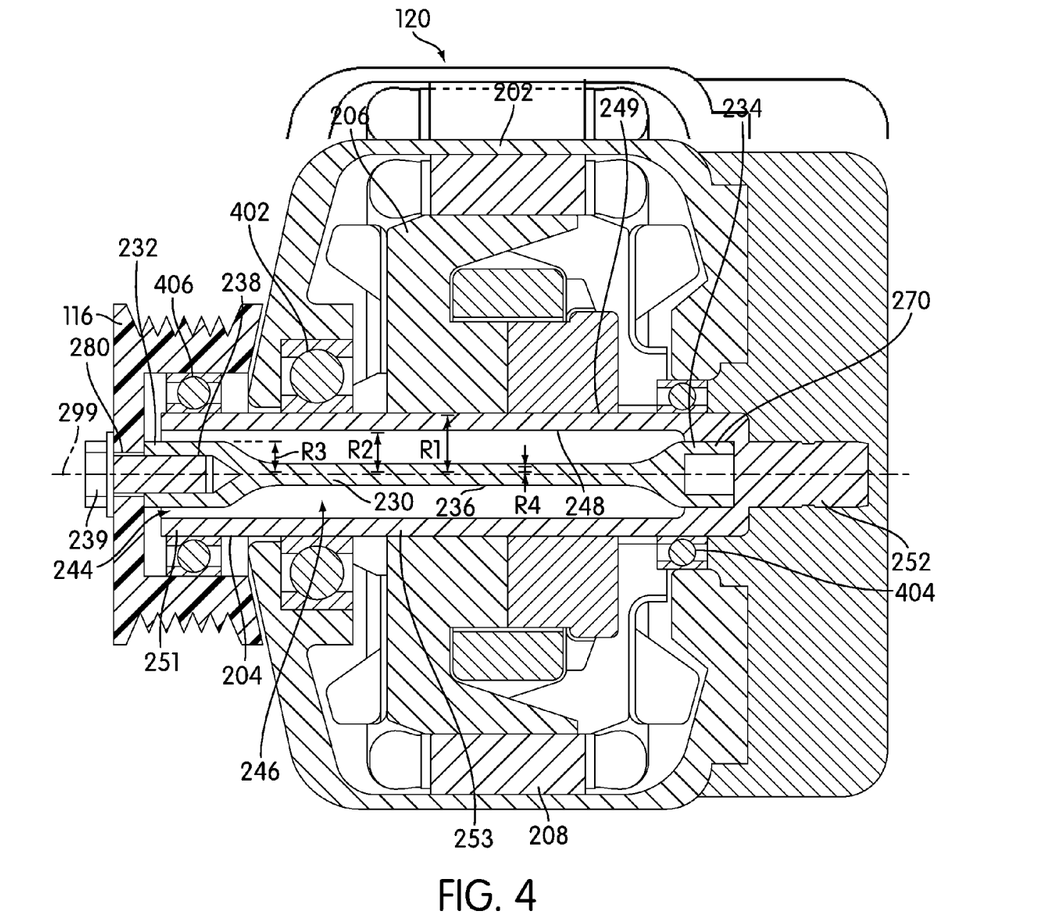
FIG. 4 is a side cross sectional view of an embodiment of an alternator assembly.

FIGS. 3 and 4 are intended to illustrate an exemplary embodiment of the coupling arrangement between pulley 116 and rotor 206. In particular, FIG. 3 illustrates an exploded isometric view of an embodiment of the coupling arrangement between pulley 116 and shaft 204 of rotor 206 and FIG. 4 illustrates a side cross sectional view of an embodiment of the coupling arrangement between pulley 116 and rotor 206. For purposes of clarity, only some components of alternator assembly 120 are shown in FIG. 3. Moreover, for purposes of illustration some components of alternator assembly 120 in FIG. 3 have been separated from other portions to which they may be fixedly or integrally attached. For example, in the current embodiment, shaft 204 is shown in isolation from other components of rotor 206 including first pole core 291 and second pole core 292, however it will be understood that in some cases shaft 204 may be fixedly and/or integrally attached to first pole core 291 and second pole core 292 as well as to other components of rotor 206 (see FIG. 2).

For consistency and convenience, directional adjectives are employed throughout this detailed description corresponding to the illustrated embodiments. Components of an alternator can be associated with an axial direction that is generally parallel with a central axis of an alternator shaft. The axial direction may include an axial outboard direction that is oriented towards a pulley attached to the alternator shaft. In addition, the axial direction can include an axial inboard direction that is oriented away from a pulley attached to the alternator shaft.

Referring to FIGS. 3 and 4, shaft 204 comprises first end portion 251 and second end portion 252. In addition, shaft 204 comprises intermediate portion 253 that is disposed between first end portion 251 and second end portion 252. First end portion 251 may be disposed axially outboard of second end portion 252. Moreover, first end portion 251 may be disposed closer to pulley 116 in the axial direction. Shaft 204 also includes central cavity 246 that extends throughout a substantial majority of the length of shaft 204. In some cases, central cavity 246 may be open on first end portion 251 at opening 244.

In the current embodiment, shaft 204 is a generally cylindrical shaft and central cavity 246 has a substantially similar cylindrical shape. However, in other embodiments the geometry of central cavity 246 could vary. In addition, shaft 204 includes interior wall 248 that bounds central cavity 246 and exterior wall 249 that forms an outer boundary for shaft 204. In the current embodiment, interior wall 248 is disposed radial distance R2 from central axis 299 of shaft 204. Exterior wall 249 is disposed radial distance R1 from central axis 299 of shaft 204. In different embodiments, the radial size of central cavity 246, indicated by radial distance R2, can vary. In an exemplary embodiment, radial distance R1 and radial distance R2 may be selected so that shaft 204 comprises a substantially rigid shaft that will not deform under the forces applied by various components of alternator assembly 120.

Figure 7:
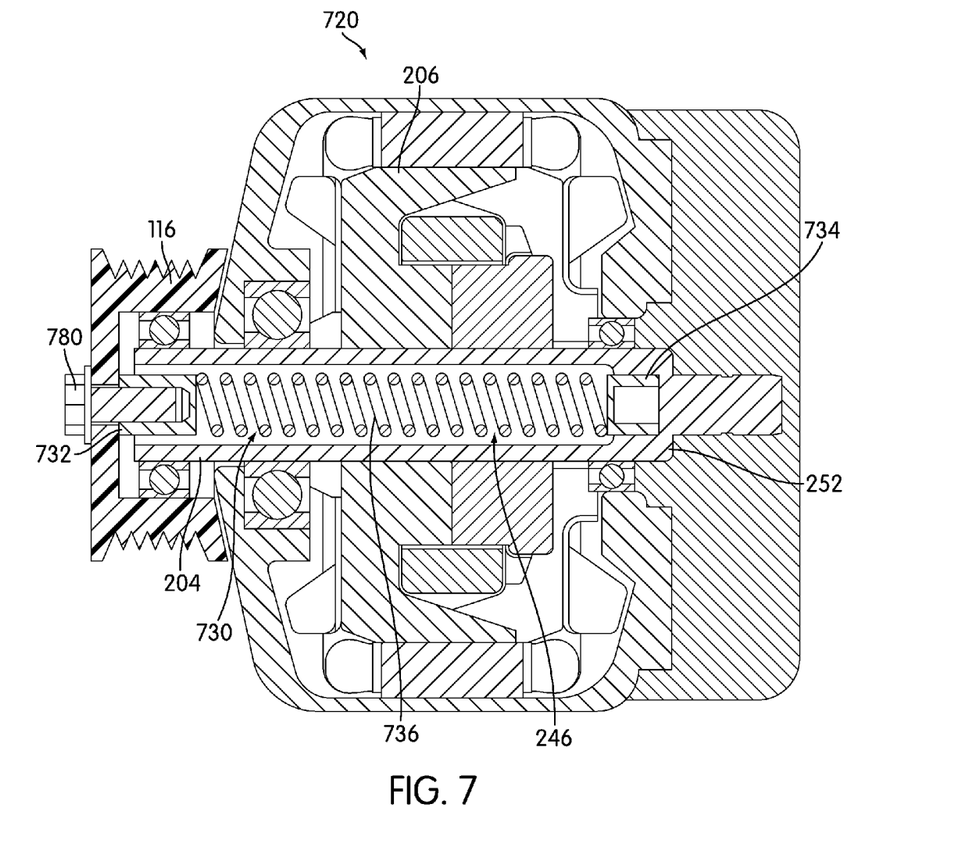
FIG. 7 is a side cross sectional view of an alternative embodiment of an alternator assembly.

Central cavity 246 may be configured to receive torsion member 230. Generally, torsion member 230 may be any component that is configured to twist or deform in some manner. In the current embodiment, torsion member 230 is torsion bar. However, in other embodiments, torsion member 230 could be a torsion spring, as shown in FIG. 7 and discussed in detail below. In still other embodiments, torsion member 230 could be any other type of component or device configured to undergo torsion.

In some embodiments, torsion member 230 can include first end portion 232, second end portion 234 and intermediate portion 236 that is disposed between first end portion 232 and second end portion 234. In this case, first end portion 232 may be disposed adjacent to pulley 116. Second end portion 234 may be disposed adjacent to second end portion 252 of shaft 204. Moreover, first end portion 232 may be disposed axially outboard of second end portion 234. In some embodiments, second end portion 234 of torsion member 230 may be fixedly attached to second end portion 252 of shaft 204. For example, in the current embodiment, second end portion 234 of torsion member 230 may be fixedly secured within recess 270 of central cavity 246. This configuration allows second end potion 234 of torsion member 230 to rotate with second end portion 252 of shaft 204. In particular, this arrangement allows torque to be transferred directly from second end portion 234 to second end portion 252.

In the current embodiment, first end portion 232 may extend outwardly from opening 244 of shaft 204. In other cases, however, first end portion 232 could be flush with first end portion 251 of shaft 204. In still other cases, first end portion 232 could be recessed within opening 244. In an exemplary embodiment, first end portion 232 of torsion member 230 may include fastener receiving portion 238 that is configured to receive a fastener of some kind. In some cases, fastener receiving portion 238 could be a threaded recess of some kind that is configured to receive a threaded screw or bolt. In other cases, fastener receiving portion 238 could be a cavity configured to receive some other kind of fastener. In this exemplary embodiment, fastener receiving portion 238 is a cavity that is configured to receive fastener 239.

Fastener 239 may extend through hole 280 of pulley 116. Moreover, fastener 239 may extend into fastener receiving portion 238 for purposes of securing pulley 116 to first end portion 232 of torsion member 230. In one embodiment, fastener 239 may be a threaded bolt that is configured to engage fastener receiving portion 238, which may be a threaded cavity. In other embodiments, however, fastener 239 could be any other kind of fastener.

In different embodiments, the size and/or geometry of torsion member 230 could vary. In the current embodiment, first end portion 232 has an approximately cylindrical geometry with a radius that tapers in a decreasing manner from first end portion 232 to intermediate portion 236. Likewise, second end portion 234 has an approximately cylindrical geometry with a radius that tapers in a decreasing manner from second end portion 234 to intermediate portion 236. In the current embodiment, torsion member 230 may be associated with radius R3 at first end portion 232 and second end portion 234. Also, torsion member 230 may be associated with radius R4 at intermediate portion 236. Moreover, radius R4 is substantially smaller than radius R3. Also, it will be apparent that both radius R3 and radius R4 are smaller than radius R2 that is associated with central cavity 246.

In some embodiments, alternator assembly 120 can be configured with one or more provisions that allow one or more components of alternator assembly 120 to rotate with respect to housing 202. For example, in some embodiments, one or more bearing assemblies can be used that allow rotor 206, torsion member 230 and pulley 116 to rotate with respect to housing 202. In particular, using one or more bearing assembly allows housing 202 to remain stationary, while rotor 206 and torsion bar 230 rotate within housing 202.

Referring to FIG. 4, alternator assembly 120 may include first bearing assembly 402, second bearing assembly 404 and third bearing assembly 406. In some embodiments, first bearing assembly 402 and second bearing assembly 404 may support rotor 206 in a rotating manner with respect to housing 202. Additionally, in some embodiments, third bearing assembly 406 may provide rotating support for pulley 116. In particular, the presence of third bearing assembly 406 allows pulley 116 to rotate with respect to first end portion 251 of shaft 204. This arrangement helps to prevent torque from being transferred directly from pulley 116 to first end portion 251 of shaft 204.

Generally, any type of bearing assembly can be used. In one embodiment, one or more bearing assemblies may comprise one or more ball bearings. In other embodiments, rollers could be used with one or more bearing assemblies. In still other embodiments, a combination of ball bearings and roller bearings could be used. In still other embodiments, any other type of bearings could be used. In an exemplary embodiment, first bearing assembly 402, second bearing assembly 404 and third bearing assembly 406 may all be ball bearing assemblies.

Figure 5:
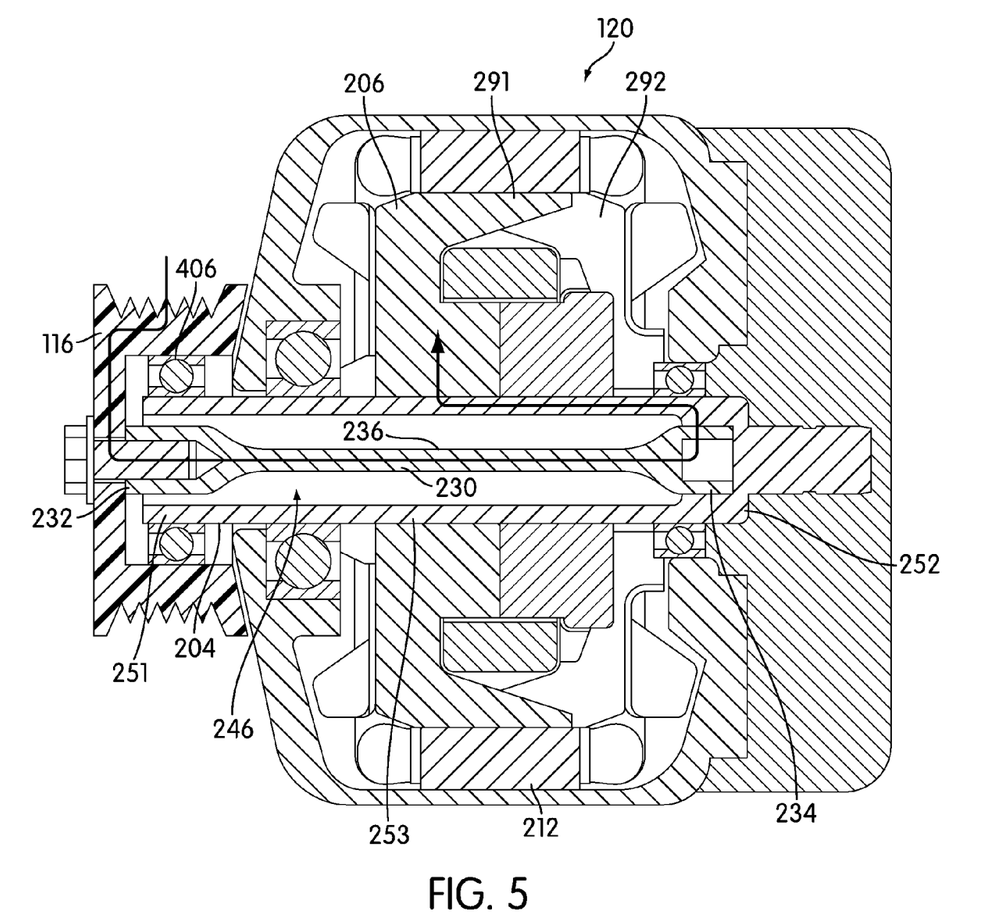
FIG. 5 is a side cross sectional view of an embodiment of an alternator assembly.

FIG. 5 is a cross sectional view of an embodiment of alternator assembly 120 that schematically illustrates the path of torque transfer through alternator assembly 120. Referring to FIG. 5, torque is received at pulley 116 during the normal operation of engine 100 (see FIG. 1). In particular, belt 110 may apply torque to pulley 116 as a crankshaft of engine 100 rotates. Because pulley 116 is attached directly to first end portion 232 of torsion member 230, rather than first end portion 251 of shaft 204, pulley 116 transfers torque directly to first end portion 232 of torsion member 230. As discussed above, third bearing assembly 406 allows pulley 116 to rotate about first end portion 251 of shaft 204 without transferring torque directly to shaft 204.

First end portion 232 then delivers torque through intermediate portion 236 of torsion member 230 to second end portion 234. At this point, second end portion 234 transfers torque directly to second end portion 252 of shaft 204. At this point, the torque is transferred from second end portion 252 of shaft 204 to intermediate portion 253 of shaft 204. Finally, the torque is transferred to the remaining components of rotor 206, including first pole core 291 and second pole core 292. As first pole core 291 and second pole core 292 rotate, electrical currents are generated within stator 212 to produce electricity.

Using the arrangement discussed here, torsion member 230 may allow some partial decoupling between pulley 116 and shaft 204. In particular, since torsion member 230 is configured to twist, first end portion 232 and second end portion 234 of torsion member 230 may not rotate together in a rigid manner. This provides some decoupling between pulley 116 and shaft 204, which is only connected to torsion member 230 at second end portion 232 of torsion member 230. Moreover, the decoupling occurs over the length of shaft 204. This configuration reduces the stiffness of the overall system which can reduce resonances and drive belt tension. The reduced belt tension helps to improve fuel economy.

An alternator assembly can include provisions that allow a rotor speed to exceed an alternator pulley speed. In embodiments including a torsion member, the torsion member can be coupled to a shaft of a rotor using a one way bearing assembly.

Figure 6:
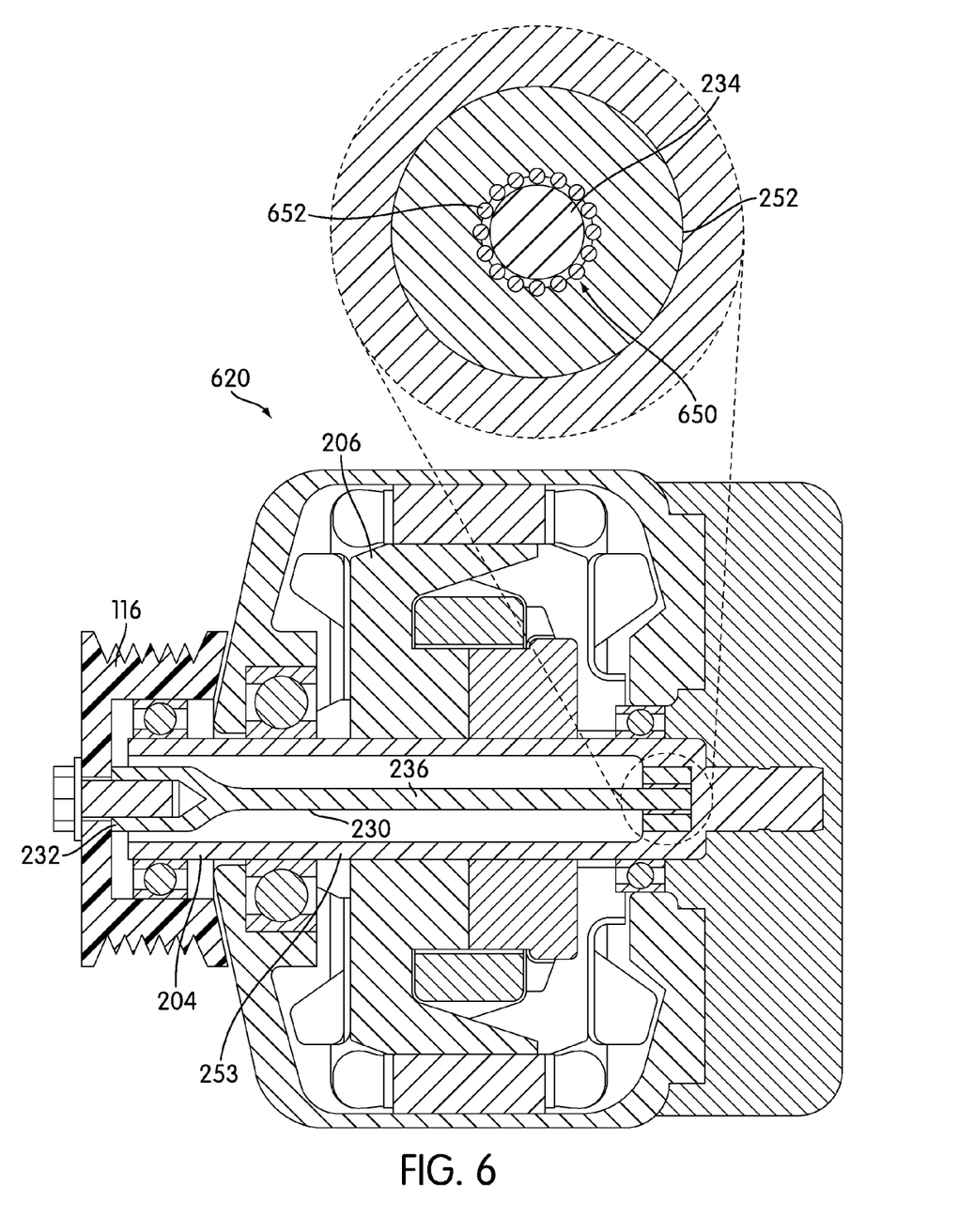
FIG. 6 is a side cross sectional view of an alternative embodiment of an alternator assembly.

FIG. 6 illustrates a cross sectional view of an alternative embodiment of an alternator assembly. Referring to FIG. 6, alternator assembly 620 may be substantially similar to the alternator assembly discussed in the previous embodiment. In particular, like numerals are used for substantially similar components.

In the current embodiment, second end portion 234 of torsion member 230 may not be fixedly coupled to second end portion 252 of shaft 204. Instead, shaft 204 and torsion member 230 may be coupled using one way bearing assembly 650. In particular, one way bearing assembly 650 is configured to provide torque transfer between torsion member 230 and shaft 204 when the rotation speed of torsion member 230 is greater than or equal to the rotational speed of shaft 204. Moreover, one way bearing assembly 650 is configured to prevent torque transfer between torsion member 230 and shaft 204 when shaft 204 is rotating at a greater speed than torsion member 230.

In this embodiment, one way bearing assembly 650 includes one way bearings 652 that provide one way torque transfer between second end portion 234 of torsion member 230 and second end portion 252 of shaft 204. In particular, in this embodiment, as pulley 116 drives torsion member 230 so that the speed of torsion member 230 is equal to or greater than the speed of shaft 204, one way bearings 652 are locked into place and cannot rotate. In this case, one way bearings 652 function to transfer torque directly between second end portion 234 of torsion member 230 and second end portion 252 of shaft 204. In other words, torque is transferred from torsion bar 230 directly to shaft 204 in the usual manner. However, as pulley 116 slows down due to reduced engine speeds, the rotational speed of torsion bar 230 may also be reduced. In this case, as the rotation speed of torsion bar 230 is reduced below the rotational speed of shaft 204, one way bearings 652 are unlocked and begin to rotate. In particular, one way bearings 652 prevent torque from being transferred between torsion member 230 and shaft 204. In other words, shaft 204 can continue to rotate at a greater speed than torsion member 230. This allows for overrun of shaft 204 and prevents the need for accelerating rotor 206 after each deceleration of engine 100 (see FIG. 1).

Generally, any type of one way bearing assembly could be used. In some cases, a press-fit assembly could be used. In other cases, however, any other kind of bearing assembly could be used.

FIG. 7 illustrates a cross sectional view of an alternative embodiment of an alternator assembly. Referring to FIG. 7, alternator assembly 720 can include many similar components to the previous embodiments. For purposes of convenience, identical numbers are used for substantially similar components.

Alternator assembly 720 may be configured with torsion member 730 that extends within central cavity 246 of shaft 204. In contrast to the previous embodiment, torsion member 730 may be a torsion spring. In particular, torsion member 730 may include first end portion 732, second end portion 734 and intermediate portion 736. First end portion 732 may be configured to fasten to pulley 116 using fastener 780. Likewise, second end portion 734 may be fixedly attached to second end portion 252 of shaft 204. Moreover intermediate portion 736 may be a spring-like portion that can twist. With this configuration, torsion member 730 may provide some decoupling between pulley 116 and shaft 204 that reduces drive belt tension and helps improve fuel economy.

Generally, any spring could be used for torsion member 730. In some embodiments, the spring could be a torsion spring that is designed specifically for twisting and similar types of deformations. In other cases, however, any other kind of spring could also be used.

It will be understood that the torsion members discussed this detailed description could be made of any materials. In some cases, a torsion member could be made of a metallic material or a material including at least one metal. In other cases, a torsion member could be made of a resilient plastic material or a material incorporating plastic. In still other embodiments, any other resilient materials that provide for some amount of twisting or torsion could be used.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. An alternator assembly for a motor vehicle, comprising:
a housing;
a shaft configured to rotate with respect to the housing, the shaft being associated with a rotor;
the shaft including a central cavity, a first end portion, and a second end portion;
a torsion member including a first end portion and a second end portion;
the torsion member being disposed within the central cavity of the shaft so that the second end portion of the torsion member is attached to the second end portion of the shaft;
a pulley associated with a belt, the pulley being disposed radially around the first end portion of the shaft;
wherein the first end portion of the torsion member is fastenably attached to the pulley;
wherein the first end portion of the shaft provides rotating support for the pulley;
a pulley bearing assembly disposed radially between the pulley and the first end portion of the shaft, wherein the pulley bearing assembly allows the pulley to rotate with respect to first end portion of shaft; and
wherein the pulley bearing assembly is in rotating contact with an internal cylindrical surface of the pulley and an external cylindrical surface of the first end portion of the shaft.

2. The alternator assembly according to claim 1, wherein the torsion member is a torsion bar.

3. The alternator assembly according to claim 1, wherein the torsion member is a torsion spring.

4. The alternator assembly according to claim 1, wherein the first end portion of the torsion member is decoupled from the first end portion of the shaft.

5. The alternator assembly according to claim 1, wherein the torsion member is fastenably attached to the pulley using a bolt.

6. The alternator assembly according to claim 1, wherein the second end portion of the torsion member is connected to the second end portion of the shaft using a one way bearing assembly.

7. The alternator assembly according to claim 1, wherein the pulley defines an outer cylindrical belt receiving surface for receiving the belt, wherein the outer cylindrical belt receiving surface has an axial length, and wherein the external cylindrical surface of the first end portion of the shaft extends axially inside the pulley through a majority of the axial length of the outer cylindrical belt receiving surface of the pulley.

8. An alternator assembly for a motor vehicle, comprising:
a housing;

a shaft configured to rotate with respect to the housing, the shaft being associated with a rotor;

the shaft including a first end portion, a second end portion opposite to the first end portion in an axial direction, and a wall defining a central cavity;

a pulley disposed radially around the wall at the first end portion of the shaft, the pulley being associated with a belt;

a torsion member disposed in the central cavity of the shaft;

wherein the pulley is connected to the second end portion of the shaft by the torsion member and wherein torque is transferred directly between the pulley and the second end portion of the shaft by the torsion member;

a first bearing assembly disposed at the second end portion of the shaft radially between the wall of the shaft and the housing, wherein the first bearing assembly allows the shaft to rotate with respect to the housing;

a second bearing assembly disposed at the first end portion of the shaft radially between the wall of the shaft and the pulley, wherein the second bearing assembly allows the shaft to rotate with respect to the pulley, and wherein the second bearing assembly is in rotating contact with an internal cylindrical surface of the pulley and an external cylindrical surface of the wall of the shaft at the first end portion of the shaft; and a third bearing assembly disposed at a portion of the shaft in between the first and second end portions of the shaft in the axial direction and radially between the wall of the shaft and the housing, wherein the third bearing assembly allows the shaft to rotate with respect to the housing.

9. The alternator assembly according to claim 8, wherein the torsion member is configured to partially decouple the pulley from the shaft.

10. The alternator assembly according to claim 8, wherein the torsion member extends beyond the wall in an axial direction away from the second end portion of the shaft and is attached to an outermost radially extending wall of the pulley.

11. The alternator assembly according to claim 8, wherein the torsion member extends through a substantial majority of the length of the central cavity.

12. The alternator assembly according to claim 8, wherein the torsion member includes an intermediate portion disposed between the first end portion and the second end portion.

13. The alternator assembly according to claim 12, wherein a first radius of the intermediate portion is less than a second radius associated with the first end portion.

14. The alternator assembly according to claim 8, wherein torsion member helps to reduce stiffness of a drive system that includes the pulley and the belt.

15. The alternator assembly according to claim 8, wherein the pulley defines an outer cylindrical belt receiving surface for receiving the belt, wherein the outer cylindrical belt receiving surface has an axial length, and wherein the external cylindrical surface of the wall of the shaft at the first end portion of the shaft extends in the axial direction inside the pulley a majority of the axial length of the outer cylindrical belt receiving surface of the pulley.

16. An alternator assembly for a motor vehicle, comprising:

a housing;

a shaft configured to rotate with respect to the housing, the shaft being associated with a rotor;

the shaft including a central cavity, a first end portion, and a second end portion;

a torsion member including a first end portion and a second end portion;

a pulley attached to the first end portion of the torsion member and disposed radially around the first end portion of the shaft;

wherein the first end portion of the shaft provides rotating support for the pulley;

the torsion member being disposed within the central cavity of the shaft so that the second end portion of the torsion member is coupled to the second end portion of the shaft;

wherein the second end portion of the torsion member is coupled to the second end portion of the shaft in a manner so that the torsion member transfers torque to the shaft while rotating at a speed greater or equal to the speed of the shaft and wherein the torsion member rotates independently of the shaft while rotating at a speed that is less than the speed of the shaft;

a pulley bearing assembly disposed radially between the pulley and the first end portion of the shaft, wherein the pulley bearing assembly allows the pulley to rotate with respect to first end portion of shaft; and wherein the pulley bearing assembly is in rotating contact with an internal cylindrical surface of the pulley and an external cylindrical surface of the first end portion of the shaft.

17. The alternator assembly according to claim 16, wherein the second end portion of the torsion member is coupled to the second end portion of the shaft using a one way bearing assembly.

18. The alternator assembly according to claim 17, wherein the one way bearing assembly is a press fit bearing assembly.

19. The alternator assembly according to claim 16, wherein the torsion member is a torsion bar.

20. The alternator assembly according to claim 16, wherein the torsion member is a torsion spring.

21. The alternator assembly according to claim 16, wherein the first end portion of the torsion member is configured to twist with respect to the second end portion of the torsion member.

22. The alternator assembly according to claim 16, wherein the first end portion of the torsion member is decoupled from the first end portion of the shaft.

23. The alternator assembly according to claim 16, wherein the pulley defines an outer cylindrical belt receiving surface for receiving a belt, wherein the outer cylindrical belt receiving surface has an axial length, and wherein the external cylindrical surface of the first end portion of the shaft extends axially inside the pulley through a majority of the axial length of the outer cylindrical belt receiving surface of the pulley.

* * * * *